US008886836B2

(12) United States Patent
Luu

(10) Patent No.: US 8,886,836 B2
(45) Date of Patent: Nov. 11, 2014

(54) PROVIDING A MULTI-COLUMN NEWSFEED OF CONTENT ON A SOCIAL NETWORKING SYSTEM

(75) Inventor: Francis Luu, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 279 days.

(21) Appl. No.: 13/494,942

(22) Filed: Jun. 12, 2012

(65) Prior Publication Data
US 2013/0332523 A1 Dec. 12, 2013

(51) Int. Cl.
*G06F 17/30* (2006.01)
(52) U.S. Cl.
USPC ............ 709/246; 709/217; 709/229; 705/1.1
(58) Field of Classification Search
CPC .... H04L 29/08072; H04L 29/06; H04L 67/02
USPC ............................. 709/217, 229, 246; 705/1.1
See application file for complete search history.

(56) References Cited

U.S. PATENT DOCUMENTS

| | | | |
|---|---|---|---|
| 7,822,812 B2 * | 10/2010 | Mathur et al. ................ | 709/204 |
| 7,827,234 B2 * | 11/2010 | Eisenberger et al. ......... | 709/203 |
| 7,899,862 B2 * | 3/2011 | Appelman et al. ............ | 709/204 |
| 2004/0148347 A1 * | 7/2004 | Appelman et al. ............ | 709/204 |
| 2008/0040673 A1 | 2/2008 | Zuckerberg et al. | |
| 2008/0071929 A1 * | 3/2008 | Motte et al. ................... | 709/246 |
| 2008/0082941 A1 | 4/2008 | Goldberg et al. | |
| 2008/0176655 A1 * | 7/2008 | James et al. ................... | 463/42 |
| 2011/0202852 A1 | 8/2011 | Jeong et al. | |
| 2012/0215846 A1 | 8/2012 | Howes et al. | |

* cited by examiner

*Primary Examiner* — Khanh Dinh
(74) *Attorney, Agent, or Firm* — Fenwick & West LLP

(57) ABSTRACT

News feed stories are ranked so that some stories appear above other stories for users of a social networking system. These "top" news stories are selected based on a ranking algorithm that incorporates an analysis of affinities for interests, users, and entities in the social networking system based on user interactions as well as story layout dimensions. The top news stories are presented in a multiple-column format, such as a grid format. Top news stories may be presented higher or in a more prominent placement among one or more columns in the story layout as compared to other news stories. The ranking of the top new news stories may change after a top news story is viewed. The multiple-column newsfeed enables a more visually pleasant placement of targeted advertisements on the social networking system.

43 Claims, 8 Drawing Sheets

Top News — 504　　　　　　　　　　　　500

Whitney Houston and 50 friends are talking about
Whitney Houston. — 506　　　　　　　502
Whitney lives on.

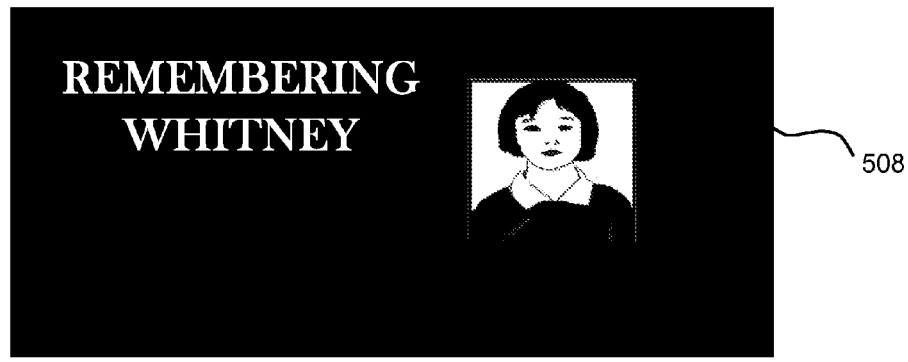
508

150,206 people like this.
Like Comment 4 days ago

Rick Rolls and 10 friends　510　Joe Schmo and 8 other friends are in the
are talking about Puppies.  Richmond District of San Francisco right now.

Puppy Bowl VI was　512　　Such good Pho here. At Pho Clement 522
awesome!　　　　　　　with 3 others.
　　　　　514　　　　　　　　　　　　524

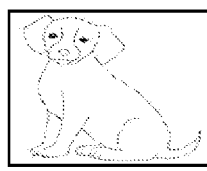
516　　　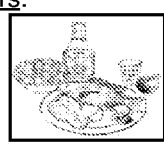
　　　　526　　528
Like Comment 4 days ago　　　Like Comment 45 minutes ago Techcrunch Disrupt　518　Chase Smith posted a　Roy Jones and 10 friends
winner getaround.com　　picture: Check out my　listened to Whitney
　　　　　　　　　　　new gym shoes!　　Houston in the past hour.　530

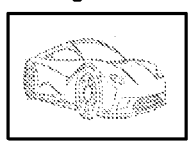　　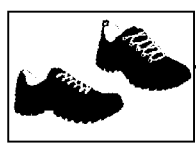　536　 Roy Jones is listening
520　　　　　　　　　　　538　to: Whitney Houston –
　　　　　　　　　　　　　　　　　　I Wanna Dance ...
The best way to get　Like Comment 2　　Bob White likes this.
around in San Francisco.　minutes ago　　　Like Comment
Find out more.　　　　　540　　　　　　　　　　532
　　　　　　　　　　　　　　　 Home by Whitney
　　　　　　　　　　　　　　　　　Houston
　　　　　　　　　　　　　　　　　www.youtube.com
　　　　　　　　　　　　　　　　　Like Comment
　　　　　　　　　　　　　　　　　　　　　534

FIG. 5A

Top News             500

Whitney Houston and 50 friends are talking about Whitney Houston. — 504, 506, 502

Whitney lives on.

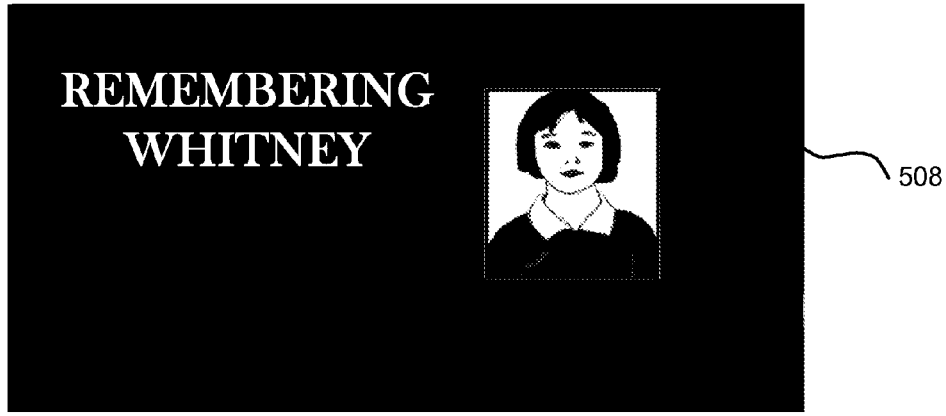

508

150,206 people like this.
Like Comment 4 days ago — 510     550

---

Mike Wynn commented on Whitney Houston's post: — 552    [X]

" " You'll always be in our hearts, Whitney! — 554
Like Comment 5 minutes ago — 556
— 558

7 live   7 Live
Whitney Houston's Star-Studded Funeral — 560
abcnews.go.com
Kevin Costner will reportedly speak at her service.
Like Comment 25 minutes ago — 562

Michael Tate — 564
Listen to that spin. One of my favorite and less heralded Whitney songs. — 566
— 568
Where You Are by Whitney Houston
www.youtube.com Like Comment 55 minutes ago — 570
— 572
See 47 more posts from Aretha Franklin, Dustin Pink, and 45 others

FIG. 5B

Top News

Chase Smith posted a picture:
Check out my new gym shoes!
Like Comment 2 minutes ago

 Harvey's
Mito Sanz and 10 other friends like this.
Like

 EdgeSF
Mike Jose and 3 other friends checked in here.
Like

 P.F. Chang's
407 people like this.
Like

 Roy Jones and 15 friends listened to Whitney Houston in the past hour.

Whitney Houston – I Wanna Dance ...
Bob White likes this.
Like Comment

 Home by Whitney Houston
www.youtube.com
Like Comment

Other Stories

Michael Roberts and 34 friends shared a link.

 Please share this with friends and loved ones. http://www.getup.org.au/marriagematters
Share
Like Comment 10 hours ago Mary Joseph and Peter Carol are now friends. Peter found Mary through Classmate Search.
  Like Comment 9 hours ago Mary Allen commented on Debbie Chang's photo.
  66 Tommy, looking good in that hoodie!
  Like Comment 5 hours ago
  Joe Jones and 4 others like this

FIG. 5D

PROVIDING A MULTI-COLUMN NEWSFEED OF CONTENT ON A SOCIAL NETWORKING SYSTEM

BACKGROUND

This invention relates generally to social networking, and in particular to selectively providing content in a multi-column or multiple-column display on a social networking system.

In recent years, users of social networking systems have shared their interests and engaged with other users of the social networking systems by sharing photos, real-time status updates, and playing social games. The amount of information gathered from users is staggering-information describing a variety of "newsworthy" items, including recent moves to a new city, graduations, births, engagements, marriages, and the like, as well as more mundane content such as status messages, information about what music has been listened to by users, and recent check-in events at coffee shops. As users become more connected with other users and entities on the social networking system, the number of content items provided to the users increases exponentially. Existing social networking systems have ordered content items in reverse chronological order such that newly published content is displayed first. However, as a result of a flood of content items published on social networking systems, users may be exposed to irrelevant and uninteresting content while missing more relevant content that was previously presented.

Social networking systems may rank content items based on user interests and affinities for other users, but providing a continuous and chronological stream of content to users may effectively obscure more interesting and relevant content items among less interesting content items that have been more recently published. Because users may load a page of a social networking system without reading content items provided on the page, interesting and relevant content items may never be seen by the users. As a result of a decline in the user experience, users may become less engaged with the social networking system.

Specifically, users of social networking systems do not have an effective tool to indicate whether content items have been read or otherwise consumed. Providing users with efficient methods of consuming content items on a social networking system is valuable in providing a better user experience for users. As a result of consumption of content items, highly targeted contextual advertising may further provide valuable advertising revenue to the social networking system. However, existing systems have not provided users with tools or methods of managing the consumption of numerous incoming content items.

SUMMARY

News feed stories are ranked so that new stories appear above previously viewed stories for users of a social networking system. Top news stories are selected based on a ranking algorithm that incorporates an analysis of affinities for interests, users, and entities in the social networking system based on user interactions as well as story layout dimensions. The top news stories are presented in a multiple-column format, including a grid format. Top news stories may be presented higher or in a more prominent placement among one or more columns in the story layout as compared to other news stories. The ranking of the top new news stories may change after a top news story is viewed. Other new stories are provided after the top new stories in a chronological order. Based on a view state that includes an order of previously provided news feed stories and received user input, the social networking system may determine whether to provide new news stories to a viewing user. The multiple-column newsfeed display enables better placement of targeted advertisements on the social networking system.

BRIEF DESCRIPTION OF THE DRAWINGS

FIGS. 5A-5D are examples of a user interface for selectively providing content in a multiple-column display to a viewing user of a social networking system, in accordance with an embodiment of the invention.

Figure 1:
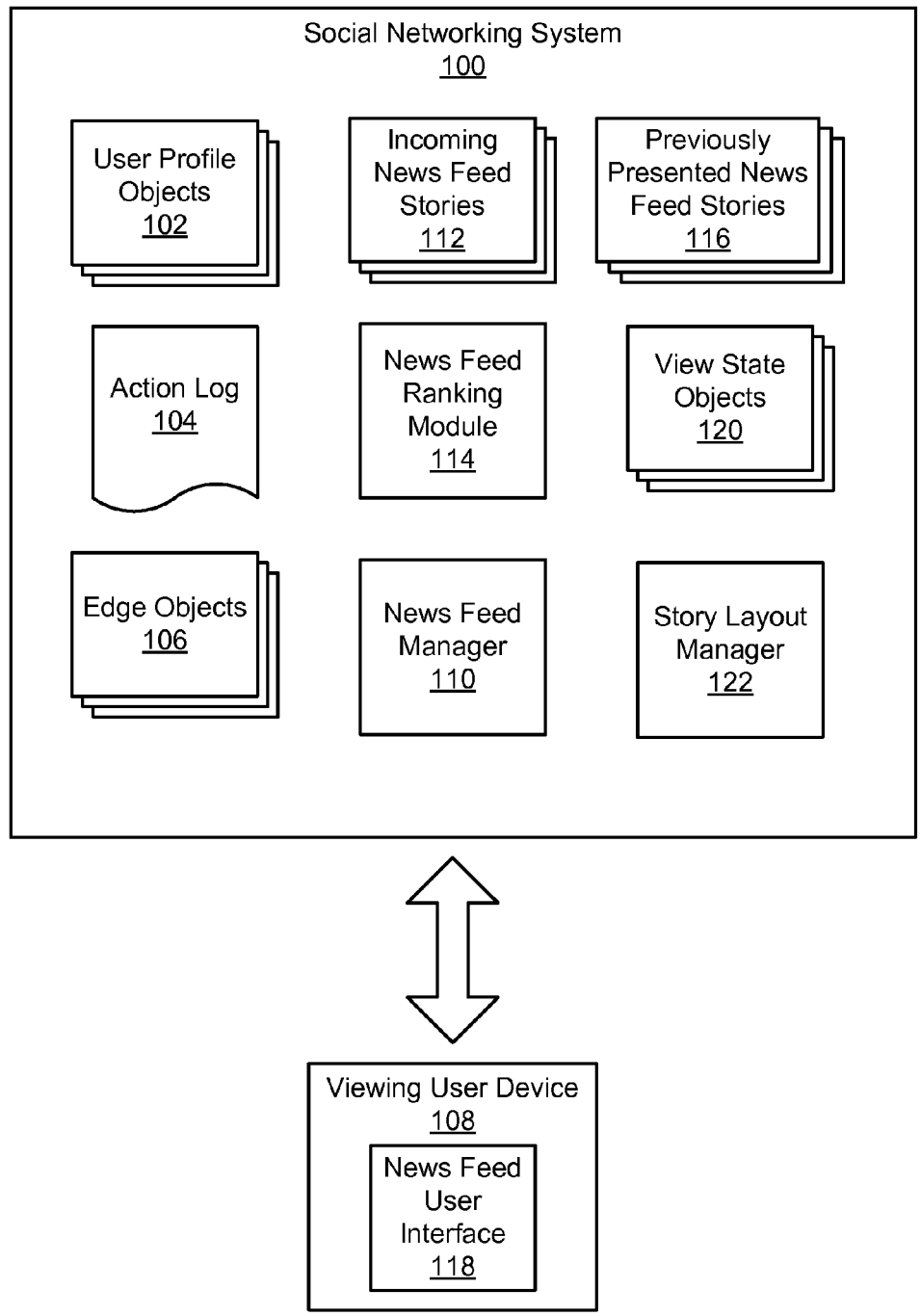
FIG. 1 is high level block diagram illustrating a process of selectively providing content in a multiple-column display on a social networking system, in accordance with an embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A social networking system offers its users the ability to communicate and interact with other users of the social networking system. Users join the social networking system and add connections to a number of other users to whom they desire to be connected. Users of social networking system can provide information describing them which is stored as user profiles. For example, users can provide their age, gender, geographical location, education history, employment history and the like. The information provided by users may be used by the social networking system to direct information to the user. For example, the social networking system may recommend social groups, events, and potential friends to a user.

In addition to declarative information provided by users, social networking systems may also record users' actions on the social networking system. These actions include communications with other users, sharing photos, interactions with applications that operate on the social networking system, such as a social gaming application, responding to a poll, adding an interest, and joining an employee network. A social networking system may also be able to capture external website data that is accessed by its users. This external website data may include websites that are frequently visited, links that are selected, and other browsing data. Information about users, such as stronger interests in particular users and applications than others based on their behavior, can be generated from these recorded actions through analysis and machine learning by the social networking system.

A social networking system may also attempt to infer information about its users. A social networking system may analyze posted content by users that include keywords, such as "wedding." Location information may be gathered from content items posted by users to infer a home location of the user. As a result, a social networking system may infer certain profile attributes of a user, such as geographic location, educational institutions attended, and age range, by analyzing the user's connections and their declared profile information. Inferring profile attributes are further discussed in "Inferring User Profile Information," U.S. application Ser. No. 12/916, 322, filed on Oct. 29, 2010, which is hereby incorporated by reference.

A social networking system may also enable users to explicitly express interest in a concept, such as celebrities, hobbies, sports teams, books, music, and the like. These interests may be used in a myriad of ways, including targeting advertisements and personalizing the user experience on the social networking system by showing relevant stories about other users of the social networking system based on shared interests. In one embodiment, a social networking system may compute affinity scores for users' interests either explicitly expressed or otherwise inferred on the social networking system and use these affinity scores in ranking new content items that will be published in news feeds, or communication channels on the social networking system, for the users. News feed rankings based on affinity scores are further discussed in related applications, "Adaptive Ranking of News Feed in Social Networks," U.S. application Ser. No. 13/194,770, filed on Jul. 29, 2011 and "Ranking Newsfeed Based on Social Graph Information," U.S. application Ser. No. 13/194,773, filed on Jul. 29, 2011, both which are hereby incorporated by reference.

A social graph includes nodes connected by edges that are stored on a social networking system. Nodes include users and objects of the social networking system, such as web pages embodying concepts and entities, and edges connect the nodes. Edges represent a particular interaction between two nodes, such as when a user expresses an interest in a news article shared by another user about "America's Cup." The social graph may record interactions between users of the social networking system as well as interactions between users and objects of the social networking system by storing information in the nodes and edges that represent these interactions. Custom graph object types and graph action types may be defined by third-party developers as well as administrators of the social networking system to define attributes of the graph objects and graph actions. For example, a graph object for a movie may have several defined object properties, such as a title, actors, directors, producers, year, and the like. A graph action type, such as "purchase," may be used by a third-party developer on a website external to the social networking system to report custom actions performed by users of the social networking system. In this way, the social graph may be "open," enabling third-party developers to create and use the custom graph objects and actions on external websites.

Third-party developers may enable users of the social networking system to express interest in web pages hosted on websites external to the social networking system. These web pages may be represented as page objects in the social networking system as a result of embedding a widget, a social plug-in, programmable logic or code snippet into the web pages, such as an iFrame. Any concept that can be embodied in a web page may become a node in the social graph on the social networking system in this manner. As a result, users may interact with many objects external to the social networking system that are relevant to a keyword or keyword phrase, such as "Justin Bieber." Each of the interactions with an object may be recorded by the social networking system as an edge. By enabling advertisers to target their advertisements based on user interactions with objects related to a keyword, the advertisements may reach a more receptive audience because the users have already performed an action that is related to the advertisement. For example, a merchandiser that sells Justin Bieber t-shirts, hats, and accessories may target ads for new merchandise to users that have recently performed one of multiple different types of actions, such as listening to Justin Bieber's song "Baby," purchasing Justin Bieber's new fragrance, "Someday," commenting on a fan page for Justin Bieber, and attending an event on a social networking system for the launch of a new Justin Bieber concert tour. Enabling third-party developers to define custom object types and custom action types is further described in a related application, "Structured Objects and Actions on a Social Networking System," U.S. application Ser. No. 13/239,340 filed on Sep. 21, 2011, which is hereby incorporated by reference.

Even though a social networking system may collect, and in some cases infer, information about its users, significant resources must be expended to organize the staggering amounts of data collected. A social networking system having hundreds of millions of users, for example, gathers and infers a staggering amount of information about its users. To address issues of scalability and efficiently expending computing resources, a social networking system provides a snapshot of databases for modules to process. Recent changes in a user's personal life, such as an engagement, birth of a child, moving across the country, graduating from college, and starting a new job, can be collected and inferred from these snapshots on social networking systems. Content items related to these life events may be prioritized in a ranking of news feed stories selectively provided to users to ensure that the most relevant information is consumed first, in one embodiment.

As users accumulate more connections on a social networking system, news feeds, or the communication channels used by the social networking system to communicate content posted by the users' connections, have the potential to become inundated and clogged with irrelevant information. Ranking content items according to users' interests and affinities for other users may help to mitigate this problem. However, a social networking system may be unable to determine whether users that engage with the social networking system often, even multiple times a day with different devices associated with the same user profile, have finished viewing the content items already provided. Often times, a user may load a web page on the social networking system and inadvertently overlook a particularly engaging content item posted by another user connected to the user. This leads to less user engagement on the social networking system.

Social networking systems strive to keep their users engaged by delivering relevant content as soon as users are able to consume the content. Determining whether users are ready to view more content, especially as users accumulate hundreds and even thousands of "friends" on the social networking system, is valuable to ensuring that users remain engaged with the social networking system without inundating their newsfeeds with irrelevant content. Relevant content may be provided in a newsfeed displayed in a stream format, such that each content item is displayed consecutively in a horizontal or vertical stream. Mechanisms may be used by a social networking system to manage the display of content in a newsfeed displayed in a stream format, as further described in a related application, "Selectively Providing Content on a Social Networking System" U.S. patent application Ser. No. 13/421,786, filed on Mar. 15, 2012, hereby incorporated by reference. Relevant content may also be provided in a newsfeed displayed in a multiple-column format, such that content items are displayed as "stories" in a story layout. The story layout may be determined based on a layout of varying sizes, such as a three column layout, a four column layout, a five column layout, and so forth. In one embodiment, the size of the browser window operating on the user device may be used in determining the layout. In another embodiment, the resolution of the display on the user device may be used in determining the layout. The size of a story may be larger or smaller, taking up more than one column and/or row, based on a determined relevance and/or affinity score for the story by the social networking system for the viewer. Machine learning and heuristics analysis may be used in selecting sizes of news feed stories in a multiple-column display to users of a social networking system.

FIG. 1 illustrates a high level block diagram of a process for selectively providing content in a multiple-column display to users of a social networking system, in one embodiment. The social networking system 100 uses different types of information about users in the process of selectively providing content to users, including user profile objects 102, an action log 104, and edge objects 106. Each user of the social networking system 100 is associated with a specific user profile object 102. These user profile objects 102 include declarative information about the user that was explicitly shared by the user as well as any profile information inferred by the social networking system 100. In one embodiment, a user profile object 102 may include thirty or more different data fields, each data field describing an attribute of the corresponding user of the social networking system 100.

Users of the social networking system 100 may take actions using the social networking system 100 that are associated with one or more objects. Information describing these actions is stored in the action log 104. The action log 104 includes many different types of interactions that occur on a social networking system, including commenting on a photo album, communications between users, becoming a fan of a musician, and adding an event to a calendar. Additionally, the action log 104 records a user's interactions with advertisements on the social networking system 100 as well as other applications operating on the social networking system 100.

Edge objects 106 store information about users' connections to other nodes on a social networking system 100. Such information may include the interactions between the user and the connection on the social networking system 100, including wall posts, comments on photos, geographic places where they have been tagged together, and photos in which they have both been tagged in. In one embodiment, an edge object 106 includes information about the strength of the connection between the users, such as an affinity score. If a user has a high affinity score for a particular connection, the social networking system 100 has recognized that the user interacts highly with that connection. Affinity scores and methods of gathering this social data from a social networking system are described further in "Contextually Relevant Affinity Prediction in a Social Networking System," U.S. application Ser. No. 12/978,265, filed on Dec. 23, 2010, which is hereby incorporated by reference.

A viewing user device 108 may connect with the social networking system 100 and request content in a news feed user interface 118. A news feed manager 110 responds to the request from the viewing user device 108 by first determining previously presented news feed stories 116 for the user associated with the viewing user device 108. Incoming news feed stories 112 for the user associated with the viewing user device 108 are determined and then ranked by a news feed ranking module 114. The top incoming news feed stories 112 may be selected by the news feed manager 110 and displayed in the news feed above the remaining incoming news feed stories 112. The news feed ranking module 114 may use information about the user associated with the viewing user device 108 to determine the ranking of content items in the news feed for the user. This user information may be obtained from user profile objects 102, edge objects 106, and actions stored in the action log 104 associated with the user.

The news feed manager 110 may then provide previously presented news feed stories 116 below the incoming news feed stories 112 for rendering in the news feed user interface 118 based on received user input that indicates the user has finished consuming the previously presented news feed stories 116. As a result, the viewing user will see the top new news stories first, followed by the remaining new news stories, and then the previously presented news feed stories. Such user input may include clicking on, or otherwise selecting, a link in the news feed user interface 118 for more news stories, detecting a scroll action from the viewing user device 108, receiving clicking actions on various content items in news feed user interface 118, and an elapsed time spent on the news feed user interface 118 after loading the news feed user interface 118 on the viewing user device 108.

The news feed manager 110 records, for each user on the social networking system 100, a "view state" of the news feed stories that have been presented in each user's news feed, storing the order of the stories that have been presented. The view state at a particular time may be stored in a view state object 120 associated with the user. Using this view state, the news feed manager 110 may determine whether news feed stories have evolved, changing the ranking of the news feed stories. For example, a viewing user may be connected to another user that shared a link about a news story about Christmas shopping. The viewing user may express interest in this link by sharing the news story with other users connected to the viewing user, commenting on the news story, or "liking" the news story. Later, other users connected to the viewing user may further interact with the news story or may post other news stories related to the topic of the news story about Christmas. The news feed ranking module 114 may rank the news story higher as a result of users with high affinities interacting with the news feed story. Because these interactions have evolved the previously presented news story 116, the news story may be presented to the viewing user as an incoming news feed story 112 by the news feed manager 110. In addition, the news feed manager 110 may cluster the news feed stories about Christmas into one news feed story, showing the newer interactions by other users.

The news feed manager 110 may, in one embodiment, use machine learning methods to selectively provide new content to users of the social networking system 100. Each user on the social networking system 100 may have different affinities for other users on the social networking system 100, interests and concepts embodied as nodes on the social graph of the social networking system 100, and applications that may be installed on the social networking system 100. Content items produced by these users, interests, concepts, and applications have the potential to flood users with irrelevant information, effectively hiding more relevant items. Machine learning may be used to predict which content items are more relevant for users as well as when users may be ready to consume new content items by analyzing user behaviors on the social networking system.

As a viewing user device 108 loads a news feed user interface 118, the news feed manager 110 may render a link in the news feed user interface 118 to indicate a number of new stories that have been accumulated. In this way, the user may read and/or consume top news stories that have been posted since the last time the user logged in. In one embodiment, the news feed manager 110 may determine that the user associated with the viewing user device 108 is actively engaged with the news feed interface 118 and may automatically update the news feed user interface 118 with top incoming news feed stories 112 as ranked by the news feed ranking module 114. In another embodiment, the news feed manager 110 may determine that a top incoming news feed story 112 warrants automatically updating the news feed user interface 118 for the user based on past user behaviors. In a further embodiment, the news feed manager 110 may update the link in the news feed user interface 118 to indicate an updated number of new stories that have been accumulated and await user input, such as a mouse click, a touchpad input, voice input, gesture input, or keyboard input, to execute the link and display the new incoming news feed stories 112. A "click" action may be defined as any user input used to select and execute a link.

In one embodiment, the news feed manager 110 may dynamically render the previously presented news feed stories 116 and incoming news feed stories 112 in a ranking determined by the news feed ranking module 114 based on user input received, or lack of receipt, from the news feed user interface 118 on the viewing user device 108. For example, a user may access a social networking system 100 through a viewing user device 108 in the morning and browse through content items that are provided in the news feed user interface 118. Once provided in the news feed user interface 118, the order of the previously presented news feed stories 116 is stored as the user's view state at that time in a view state object 120 associated with the viewing user. The user may then browse on other sites on the viewing user device 108 and leave the news feed user interface 118 open, where the news feed user interface 118 is embodied on a web page loaded by a web browser or on a native application on a mobile device. Later that afternoon, the user may again access the social networking system 100 through the viewing user device 108 to either continue browsing previously presented news feed stories 116 or new incoming news feed stories 112. As described above, the news feed manager 110 may render a link in the news feed user interface 118 to indicate that incoming news feed stories 112 are available. The user may click on the link to view the new incoming news feed stories 112. This user input may cause the news feed manager 110 to provide for display in the news feed user interface 118 the incoming news feed stories 112 as ranked by the news feed ranking module 114 above the previously presented news feed stories in the order stored in the user's view state that morning retrieved from the view state object 120 associated with the user.

Alternatively, the user may never click on that link to display the incoming news feed stories 112. In that case, the news feed manager 110 may continue holding the incoming news feed stories 112 while refreshing the link that indicates an increasing amount of new stories. On the other hand, the news feed manager 110 may automatically refresh the news feed user interface 118 to display the incoming news feed stories 112 with the previously presented news feed stories 116. In one embodiment, the news feed ranking module 114 may rank a new incoming news feed story 112 below a previously presented news feed story 116 because the previously presented news feed story 116 may have been highly interacted with by other users connected to the viewing user, may have evolved by the original publishing user commented on the previously presented news feed story 116, or may be of high interest to multiple users connected to the viewing user. As a result, the incoming news feed stories are selectively provided to the viewing user based on information gathered about that user as well as the view state of the news feed for that user.

A story layout manager 122 determines the dimensions of stories determined to be relevant by the news feed manager 110 for presentation on a multiple-column display to a viewing user of the social networking system 100. A story may include references to one or more content items about a particular subject being talked about by users of the social networking system 100 or a particular location in which users have checked-in recently. A story may also include an aggregation of actions performed by one or more users of the social networking system 100, such as miles ran, songs listened to, stories shared, and so forth. Each story may include one or more graphic images of different sizes. A story may be displayed across several columns in the multiple-column display of the news feed on the social networking system 100. In one embodiment, the story layout manager 122 may receive information from the user device about the display resolution of the user device. Using this information about the display resolution of the user device, the story layout manager 122 may adjust the story layout to include more or fewer columns and/or rows. In another embodiment, the story layout manager 122 may receive information, in real-time, about the size of the browser window operating on the user device. Similarly, using this information about the size of the browser window operating on the user device, the story layout manager 122 may adjust the story layout to include more or fewer columns and/or rows.

System Architecture

Figure 2:
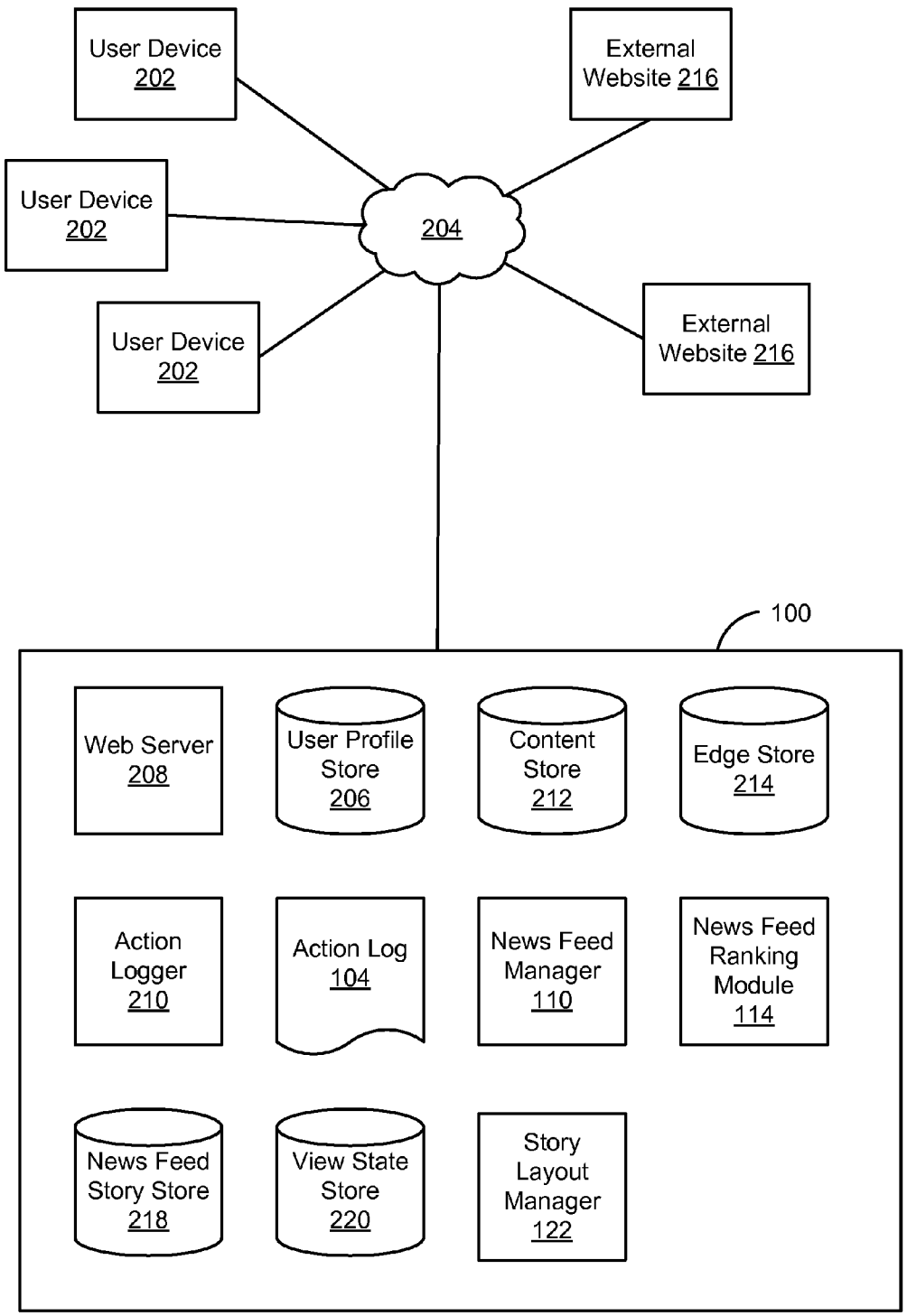
FIG. 2 is a network diagram of a system for selectively providing content in a multiple-column display on a social networking system, showing a block diagram of the social networking system, in accordance with an embodiment of the invention.

FIG. 2 is a high level block diagram illustrating a system environment suitable for selectively providing content in a multiple-column display to users of a social networking system, in accordance with an embodiment of the invention. The system environment comprises one or more user devices 202, the social networking system 100, a network 204, and external website 216. In alternative configurations, different and/or additional modules can be included in the system.

The user devices 202 comprise one or more computing devices that can receive user input and can transmit and receive data via the network 204. In one embodiment, the user device 202 is a conventional computer system executing, for example, a Microsoft Windows-compatible operating system (OS), Apple OS X, and/or a Linux distribution. In another embodiment, the user device 202 can be a device having computer functionality, such as a personal digital assistant (PDA), mobile telephone, smart-phone, etc. The user device 202 is configured to communicate via network 204. The user device 202 can execute an application, for example, a browser application that allows a user of the user device 202 to interact with the social networking system 100. In another embodiment, the user device 202 interacts with the social networking system 100 through an application programming interface (API) that runs on the native operating system of the user device 202, such as iOS and ANDROID.

In one embodiment, the network 204 uses standard communications technologies and/or protocols. Thus, the network 204 can include links using technologies such as Ethernet, 802.11, worldwide interoperability for microwave access (WiMAX), 3G, 4G, CDMA, digital subscriber line (DSL), etc. Similarly, the networking protocols used on the network 204 can include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP). The data exchanged over the network 204 can be represented using technologies and/or formats including the hypertext markup language (HTML) and the extensible markup language (XML). In addition, all or some of links can be encrypted using conventional encryption technologies such as secure sockets layer (SSL), transport layer security (TLS), and Internet Protocol security (IPsec).

FIG. 2 contains a block diagram of the social networking system 100. The social networking system 100 includes a user profile store 206, a web server 208, an action logger 210, an action log 104, a content store 212, an edge store 214, a news feed manager 110, a news feed ranking module 114, a story layout manager 122, a news feed story store 218, and a view state store 220. In other embodiments, the social networking system 100 may include additional, fewer, or different modules for various applications. Conventional components such as network interfaces, security functions, load balancers, failover servers, management and network operations consoles, and the like are not shown so as to not obscure the details of the system.

The web server 208 links the social networking system 100 via the network 204 to one or more user devices 202; the web server 208 serves web pages, as well as other web-related content, such as Java, Flash, XML, and so forth. The web server 208 may provide the functionality of receiving and routing messages between the social networking system 100 and the user devices 202, for example, instant messages, queued messages (e.g., email), text and SMS (short message service) messages, or messages sent using any other suitable messaging technique. The user can send a request to the web server 208 to upload information, for example, images or videos that are stored in the content store 212. Additionally, the web server 208 may provide API functionality to send data directly to native user device operating systems, such as iOS, ANDROID, webOS, and RIM.

The action logger 210 is capable of receiving communications from the web server 208 about user actions on and/or off the social networking system 100. The action logger 210 populates the action log 104 with information about user actions to track them. Such actions may include, for example, adding a connection to the other user, sending a message to the other user, uploading an image, reading a message from the other user, viewing content associated with the other user, attending an event posted by another user, among others. In addition, a number of actions described in connection with other objects are directed at particular users, so these actions are associated with those users as well. These actions are stored in an action log 104.

An action log 104 may be used by a social networking system 100 to track users' actions on the social networking system 100 as well as external websites that communication information back to the social networking system 100. As mentioned above, users may interact with various objects on the social networking system 100, including commenting on posts, sharing links, and checking-in to physical locations via a mobile device. The action log 104 may also include user actions on external websites. For example, an e-commerce website that primarily sells luxury shoes at bargain prices may recognize a user of a social networking system 100 through social plug-ins that enable the e-commerce website to identify the user of the social networking system. Because users of the social networking system 100 are uniquely identifiable, e-commerce websites, such as this luxury shoe reseller, may use the information about these users as they visit their websites. The action log 104 records data about these users, including viewing histories, advertisements that were clicked on, purchasing activity, and buying patterns.

User account information and other related information for users are stored as user profile objects 108 in the user profile store 206. The user profile information stored in user profile store 206 describes the users of the social networking system 100, including biographic, demographic, and other types of descriptive information, such as work experience, educational history, gender, hobbies or preferences, location, and the like. The user profile may also store other information provided by the user, for example, images or videos. In certain embodiments, images of users may be tagged with identification information of users of the social networking system 100 displayed in an image. The user profile store 206 also maintains references to the actions stored in an action log and performed on objects in the content store 212.

The edge store 214 stores the information describing connections between users and other objects on the social networking system 100 in edge objects 110. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 100, such as expressing interest in a page on the social networking system, sharing a link with other users of the social networking system, and commenting on posts made by other users of the social networking system. The edge store 214 stores edge objects that include information about the edge, such as affinity scores for objects, interests, and other users. Affinity scores may be computed by the social networking system 100 over time to approximate a user's affinity for an object, interest, and other users in the social networking system 100 based on the actions performed by the user. Multiple interactions between a user and a specific object may be stored in one edge object in the edge store 214, in one embodiment. For example, a user that plays multiple songs from Lady Gaga's album, "Born This Way," may have multiple edge objects for the songs, but only one edge object for Lady Gaga.

A news feed manager 110 selectively provides content to users of a social networking system 100 and records the consumption of content by users using view state objects 120 for the users of the social networking system 100. View state objects 120 are stored in the view state store 220 and are associated with user profile objects 102 stored in the user profile store 206. As new news feed stories are generated for a user by the news feed manager 110, the news feed stories are ranked by the news feed ranking module 114 and stored in the news feed story store 218. The news feed manager 110 may communicate with user devices 202 through the web server 208 and network 204 to provide content to users of the social networking system 100. In one embodiment, a news feed manager 110 may provide content through a social plug-in, such as an iFrame, to an external website 216 to provide content posted on the social networking system 100 about an entity associated with the external website 216. As an example, a business entity that creates a page on the social networking system 100 may desire to publish the content items posted on the page's news feed in the social networking system to an external website 216 via a social plug-in installed on the external website 216.

The story layout manager 122 may retrieve news feed stories that are stored in the news feed story store 218 for determining a story layout of the incoming news feed stories 112. The story layout manager 122 may generate a "cluster" story that includes multiple news feed stories about a topic, such as the New York Knicks, as well as stories clustered around an event, such as the Super Bowl. The story layout manager 122 may also aggregate incoming newsfeed stories 112 with previously presented news feed stories 116 to generate a "cluster" story such as "9 friends are in the Mission" with an image uploaded by one of the users in a check-in event. Other types of cluster stories include an update of friends, or other users of the social networking system 100 connected to a viewing user, that now live in a specific city, such as New York, N.Y. This current location update story may rely on different types of content items, such as status messages uploaded from a mobile user device that attached geographic location coordinates to the status messages, check-in events at locations, changed addresses declared in user profiles, uploaded pictures with embedded geographic location coordinates, and so forth.

Another type of cluster story includes an "around me" story that includes different news feed stories of other users connected to the viewing user that have occurred in a close proximity to the viewing user's current geographic location. For example, a viewing user may check-in at the Eiffel Tower in Paris, France. As a result, the story layout manager 122 may retrieve new news feed stories generated by other users connected to the viewing user that are near the Eiffel Tower, such as check-ins at a nearby café, museums, and other landmarks.

The story layout manger 122 may also rely on the ranking algorithm of the news feed ranking module 114 to determine the size and dimensions of stories for placement within a determined story layout. For example, a highly relevant story that clusters multiple incoming news feed stories about Jeremy Lin, the newest point guard for the New York Knicks, may be highly ranked for a viewing user based on affinity scores and the ranking algorithm of the news feed ranking module 114. As a result, the size of the cluster story about Jeremy Lin may be larger than other less relevant stories.

In addition, the story layout manager 122 may also incorporate the size of the story into the ranking algorithm of the news feed ranking module 114, in another embodiment. For example, a graphic image included in a story may affect the size of a story. A high quality graphic image may make a story larger than another story with a lower quality graphic image. The ranking algorithm of the news feed ranking module 114 may incorporate the size of a story in ranking incoming news feed stories.

In a further embodiment, the story layout manager 122 may retrieve news feed stories stored in the news feed story store 218 to present a historical news feed to a viewing user. For example, a viewing user may want to see what news feed items were being presented to him in 2009. In response to a request from the viewing user of the social networking system 100, the story layout manager 122 may retrieve all news feed stories that were presented to the viewing user in 2009 and rank the news feed stories using a ranking algorithm included in the news feed ranking module 114. In this way, the story layout manager 122 may provide previously presented news feed stories to show relevant stories at different time periods, such as a certain day, time, week, month and/or year.

In yet another embodiment, the story layout manager 122 may present new news feed stories in a multiple-column display on the social networking system 100 such that new news feed stories replace previously presented news feed stories at predetermined time periods. For example, a viewing user of the social networking system 100 may be presented with a morning layout of the most relevant news feed stories that have been generated since the last time the viewing user accessed the social networking system 100. Later that afternoon, an afternoon layout may be provided to the viewing user with the most relevant news feed stories that have been generated that day. In the evening, an evening layout may be provided to the viewing user with the most relevant news feed stories that have been generated since the afternoon layout. In each layout, the news feed stories presented in the layout do not change until the next layout is presented to the viewing user. Thus, news feed stories in the morning layout differ from news feed stories in the afternoon layout, and so on. In other embodiments, different time periods may be used, such as hourly updates, daily updates, weekly updates, and the like.

Figure 3:
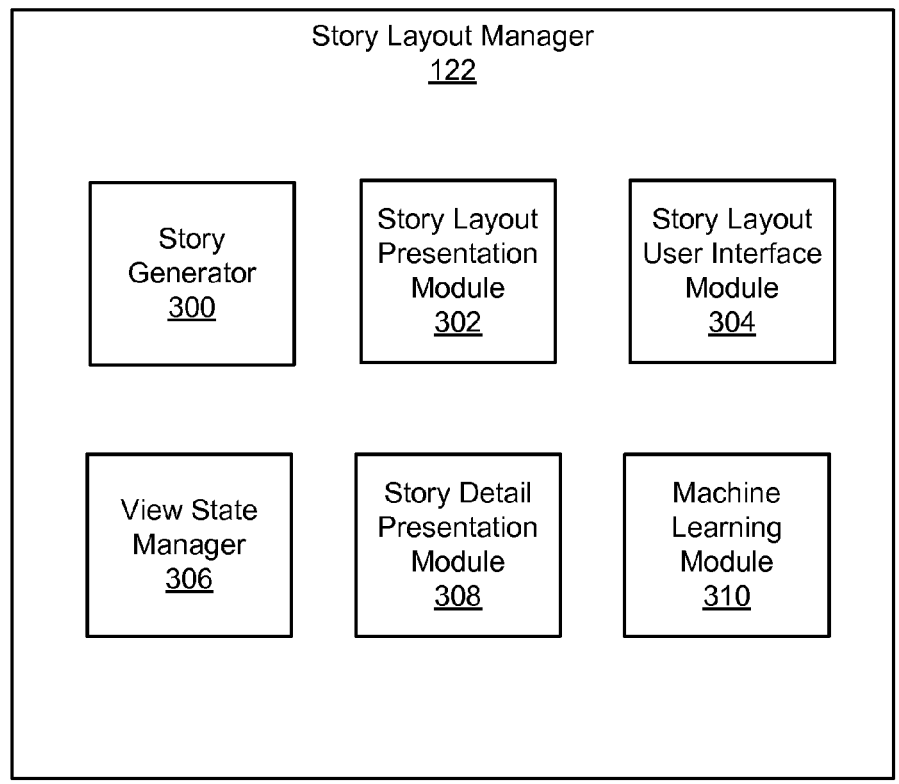
FIG. 3 is high level block diagram illustrating a story layout manager that includes various modules for managing layouts of content provided in a multiple-column display to users of a social networking system, in accordance with an embodiment of the invention.

Selecting Content to Provide to Users of a Social Networking System in a Multiple-Column Display FIG. 3 illustrates a high level block diagram of the story layout manager 122 in further detail, in one embodiment. The story layout manager 122 provides the functionality for managing activities related to determining a story layout for incoming news feed stories to be presented to users of the social networking system 100, including determining potential dimensions of news feed stories, aggregating news feed stories for presentation as a cluster story, retrieving a ranking of the news feed stories identified for presentation to a user, and presenting the news feed stories via the news feed user interface 118 in a multiple-column display. A news feed story may describe objects represented in the social networking system, for example, an image, a video, a comment from a user, status messages, external links, content generated by the social networking system, applications, games, or user profile. The story layout manager 122 includes a story generator 300, a story layout presentation module 302, a story layout user interface module 304, a view state manager 306, a story detail presentation module 308, and a machine learning module 310. These modules may perform in conjunction with each other or independently to selectively provide content to users of a social networking system 100.

The story generator 300 module generates potential dimensions of a news feed story generated by the news feed manager 110. The story generator 300 may generate multiple sizes of a news story using different graphics and information from a generated news feed story. For example, a news feed story may have a small size that only includes a text description of the story as well as the one or more actors involved in the news feed story, a medium size that includes a small graphic image included in the news feed story, and a large size that includes a larger graphic image included in the news feed story. In one embodiment, the display resolution of the user device associated with a viewing user may be used in determining the multiple sizes of a news story. In another embodiment, the size of browsers operating on a user device associated with a viewing user may also be used in determining the multiple sizes of the news story. In an embodiment, the story generator 300 stores generated news feed stories in the news feed story store 218. The news feed story store 218 may be represented as a database that links various objects related to the news feed stories. Each news feed story stored in the news feed story store 218 can be associated with other entities in the social networking system 100. For example, a news feed story may be associated with one or more users that performed an action described in the news feed story as well as with a representation of the video in the social networking system 100. The users that performed the actions described in the news feed story are called the actors. For example, if the news feed story describes a comment posted by John on a video posted by Jack, both John and Jack can be considered actors of the news feed story. As another example, a news feed story describing a comment posted by a user in response to another user's wall post may be associated with both the user who posted the message on the wall and the user who posted the comment.

News feed stories about a topic, an event, a location, a user, an entity, a page, or any other node on the social networking system 100 may be "clustered" into a single news feed story generated by the story generator 300. For example, a cluster news feed story may include multiple news feed stories generated by multiple actors sharing different links about the same topic, such as the death of Whitney Houston. Another cluster news feed story may include different types of news feed stories, such as a check-in event at a museum, a status update message, and a photo upload performed by different users of the social networking system 100 to indicate that a close friend of the viewing user from New York, N.Y. has just landed in San Francisco, Calif. for a visit. Upon selecting the cluster news feed story, the social networking system 100 may provide the multiple news feed stories that were clustered. In one embodiment, a cluster news feed story combines news feed stories that are about the same topic or refer to the same link. For example, keywords that are included in content items that posted on the social networking system 100, such as "Christmas," may be analyzed by the story generator 300 and those news feed stories may be combined into a condensed news feed story. This enables the viewing user to browse through a news feed more efficiently by combining redundant and similar posts. In another embodiment, a separate process and/or module in the social networking system 100 groups these redundant and similar posts into a single combined post and operates in conjunction with the story generator 300.

In a particular embodiment, news feed stories generated by one or more users of the social networking system 100 may be boosted and/or "grouped" with advertisements for a particular product or service. For example, a cluster news feed story about Whitney Houston may be combined with an advertisement for downloading an album by Whitney Houston. In effect, this grouping generates an advertisement that may be inserted into the multiple-column news feed display. Grouping user activity and advertisements into advertisement units for display on the social networking system is further described in a related application, "Grouping and Ordering Advertising Units Based on User Activity," U.S. patent application Ser. No. 13/348,491, filed on Jan. 11, 2012, hereby incorporated by reference.

A story layout presentation module 302 determines placement in a story layout for generated content items, or news feed stories, for display in a multiple-column format on news feed user interfaces 118 on viewing user devices 108. The story layout presentation module 302 determines the placement of news feed stories in a story layout to be presented to a user and provides the story layout of the news feed stories to the story layout user interface module 304. The story layout user interface module 304 presents the selected news feed stories in the story layout for display in a multiple-column format to the news feed user interface 118 on a viewing user device 108. The story layout presentation module 302 determines placement of a set of stories in a story layout for presentation to a viewer based on associations between the stories and the viewer. These associations are determined on various factors including, whether the story describes a user of the social networking system that is connected to the user, whether the viewer previously accessed information describing an entity represented in the social networking system that is described in the story, whether the viewer interacted with another story that is related to the current story, and the like. The story layout presentation module 302 uses the news feed ranking module 114 to determine placement of news feed stories being presented to the user in the story layout. For example, highly ranked news feed stories may occupy one or more columns in a multiple-column news feed format near the top of the story layout.

The story layout presentation module 302 may present a subset of the incoming news feed stories based on the ranking, for example, the top 10 stories, depending on the display area available on the news feed user interface 118 for presenting the stories. The story layout presentation module 302 presents the stories in the order determined by the ranking, for example, stories ranked higher may be presented more prominently compared to stories ranked lower. In an embodiment, higher ranking stories are presented in a larger format than lower ranking stories. In another embodiment, higher ranking stories are presented above lower ranking stories. In a further embodiment, the remaining incoming news stories not selected as the "top" news stories may be presented in a chronological order after the top news stories. In other embodiments, stories ranked higher may be presented more prominently by displaying them using an appropriate text color, font, text size, background color, etc.

A story layout user interface module 304 provides a user interface for providing a story layout comprising incoming news feed stories. The story layout user interface module 304 may receive user input view the provided user interface that indicates the viewing user is ready to view more news feed stories. The story layout user interface module 304 may also receive user input indicating that the viewing user wants to drill down into a particular news feed story, such as a cluster news feed story about Jeremy Lin of the New York Knicks. The received user input may be a click of a link, a hovering of a pointer over a news feed story, a touch input received through a touch screen device, a gesture received through a touch screen device, an audio command received through a user device, a gesture received through a video camera on the user device, and any user input that may be received by the user device connected to the social networking system 100.

A view state manager 306 operates independently and asynchronously from the other modules in the story layout manager 122. The view state manager 306 determines when to capture a view state of the news feed for each user of a social networking system 100. A viewing user may login to a social networking system 100 to start a new viewing session. Throughout the session, incoming news feed stories 112 may be provided to a viewing user, and as a result, the view state for the viewing user has changed. The view state manager 306 may determine that, after each news feed story is published to a user's news feed, the view state should be updated in the view state object 120. The view state object 120 is stored in a view state store 220 which may be embodied in super fast memory, in one embodiment. In one embodiment, the view state is updated when a user's session expires. The session may expire based on a lack of engagement with or activity on the social networking system 100 by the user. For example, a user may open a web browser on a user device 202 to connect to the social networking system 100. After browsing news feed stories, the user may open another browser window to view other web pages not connected to the social networking system 100. In one embodiment, the session created when the user first connected with the social networking system 100 will expire based on a predetermined time period of non-activity elapsing. In another embodiment, the viewing session expires when the user logs out of the social networking system 100. When a session expires, the view state, which includes an order of news feed stories and indications of whether news feed stories were featured or highlighted as a top story, is stored in the view state object 120 associated with the user.

Using the view state manager 306, the story layout manager 122 may determine that the user is not yet ready to read, view, or consume more news feed stories. For example, if a user starts a new session but does not scroll down the multiple-column news feed display, as detected by the story layout user interface module 304, then the story layout manager 110 may assume that the user has not yet read the news feed stories provided on the news feed user interface. If that user later starts another session, the previously presented news feed stories 116 remain frozen on the news feed user interface using the view state previously stored by the view state manager 306. A link may be rendered by the story layout user interface module 304 to indicate that incoming news feed stories 112, generated by the news feed manager 110 and ranked by the news feed ranking module 114, are available for consumption without presenting the new incoming news feed stories 112. In one embodiment, the link includes a number of incoming news feed stories 112 that are available. This number may be dynamically updated in real-time as new news feed stories are generated by the story generator 300. In another embodiment, the story layout user interface module 304 may include a preview of the new incoming news feed stories 112 that are available for consumption without publishing the incoming news feed stories 112 and changing the view state.

In a further embodiment, the story layout manager 122 may infer that a user has finished consuming or reading the news feed stories that are presented upon receiving user input from the news feed user interface on a user device 202, such as a click or selection of a link. In that case, the incoming news feed stories 112 may be automatically rendered to replace previously presented news feed stories 116 and provided according to a story layout determined by the story layout presentation module 302. The view state would also be updated by the view state manager 306. In yet another embodiment, the story layout manager 110 may hold the incoming news feed stories 112 behind a link rendered by the story layout user interface module 304 unless a top story has been generated by the news feed generator 300 and ranked by the news feed ranking module 114. The top new news story may have a prediction score, determined by the news feed ranking module 114, that exceeds a predetermined threshold to cause the story layout manager 122 to publish the top news story in the multiple-column news feed display without determining that the viewing user is ready to consume more news stories.

A story detail presentation module 308 provides more detail for a story provided in a multiple-column news feed display on the social networking system 100. Because many stories may be cluster stories, the story detail presentation module 308 may provide the multiple stories that were combined to form the cluster story provided on the multiple-column news feed display to users. In one embodiment, the story detail presentation module 308 enables a viewing user to view more information about the story provided in the multiple-column news feed display. For example, an aggregation story displaying the number of times a particular artist, such as Whitney Houston, was listened to by users of the social networking system connected to a viewing user may be provided in a multiple-column news feed display on the social networking system 100. When the viewing user clicks on the aggregation story about the number of times connected users listened to Whitney Houston, the story detail presentation module 308 may provide additional information about the aggregation story, such as individual stories indicating which users listened to which songs, cluster stories indicating which users listened to the same songs, stories grouped by album indicating which users listened to the same album of songs, and so forth. As another example, a cluster story about Jeremy Lin may include several types of news feed stories by users, entities, events, and groups connected or unconnected to the viewing user. An opinion piece that has been read by numerous users on the social networking system 100 about Jeremy Lin, though unread by the viewing user, may be included in the cluster story about Jeremy Lin. When selected, the cluster story about Jeremy Lin may expand to provide the individual news feed stories, and presented by the story detail presentation module 308. Other types of stories may be included, such as status updates by other users connected to the viewing user, upcoming events regarding Jeremy Lin as sponsored by an advertiser such as the NBA, an advertisement of Nike shoes endorsed by Jeremy Lin, links to articles about Jeremy Lin shared by other members of a group in which the viewing user belongs, videos uploaded by users of the social networking system 100 from a New York Knicks game at Madison Square Garden, and the like. Stories may be provided by other entities and applications, including other users, that a user may follow, such as a page representing Jeremy Lin, an application representing the New York Knicks, a user representing Jeremy Lin, and a page for Nike.

A machine learning module 310 may be used in the story layout manager 122 to refine the predictive models and select the predictive factors used for determining the size and dimensions of highlighted, highly ranked, and/or "top" news feed stories in the determined story layout. A highlighted story may be a story having a ranking exceeding a predetermined threshold, in one embodiment. For example, a cluster story about Whitney Houston that includes a large hi-resolution photo may be highlighted because of the sheer number of links and news feed stories being produced on the social networking system 100 at the moment. However, a viewing user of the social networking system 100 may not be particularly interested in having pop culture news stories highlighted in his or her story layout of the news feed. As a result, that viewing user may click on an 'X' on the provided news feed story about Whitney Houston to indicate that the viewing user does not want to view that type of news feed story in the future. In one embodiment, a social networking system 100 uses a machine learning algorithm to analyze user interactions with highlighted stories to retrain the predictive model. Using feedback from the user interactions indicating whether a news feed story should be highlighted, the machine learning module 310 may refine the predictive model to include more or less predictive factors and the weights assigned to each predictive factor, or coefficients, can also be adjusted based upon the response, i.e., the user interactions with the highlighted stories. As another example, a news feed story about Jeremy Lin may be provided as a smaller news feed story in a story layout for a viewing user based on the lack of historical interaction with sports stories by the viewing user. However, the machine learning module 310, using a machine learning algorithm in one embodiment, may determine that the viewing user may be more interested in sports or in Jeremy Lin, specifically. In another embodiment, heuristics analysis may be used to infer that the viewing user has become more interested in sports and/or in Jeremy Lin, based on user feedback and interactions with sports stories and/or stories about Jeremy Lin.

In another embodiment, the machine learning module 310 may be used to determine whether a previously presented news feed story, such as a shared link to a video, may evolve into a new incoming news feed story based on other users sharing the link, commenting on the link, or otherwise interacting with the link. For example, if a very close friend of a viewing user, as determined from an affinity score for the user profile object for the very close friend, shared the link that was previously presented on the viewing user's news feed, the previously presented news feed story may be combined into a single news feed story that includes the other users that have shared the link, including the very close friend and his comments about the link, if any. The machine learning module 310 may be used to determine, in conjunction with the story layout presentation module 302, whether such stories should evolve to show the most recent interactions, be presented to the viewing user again, and how should the story be provided in the multiple-column display.

Figure 4:
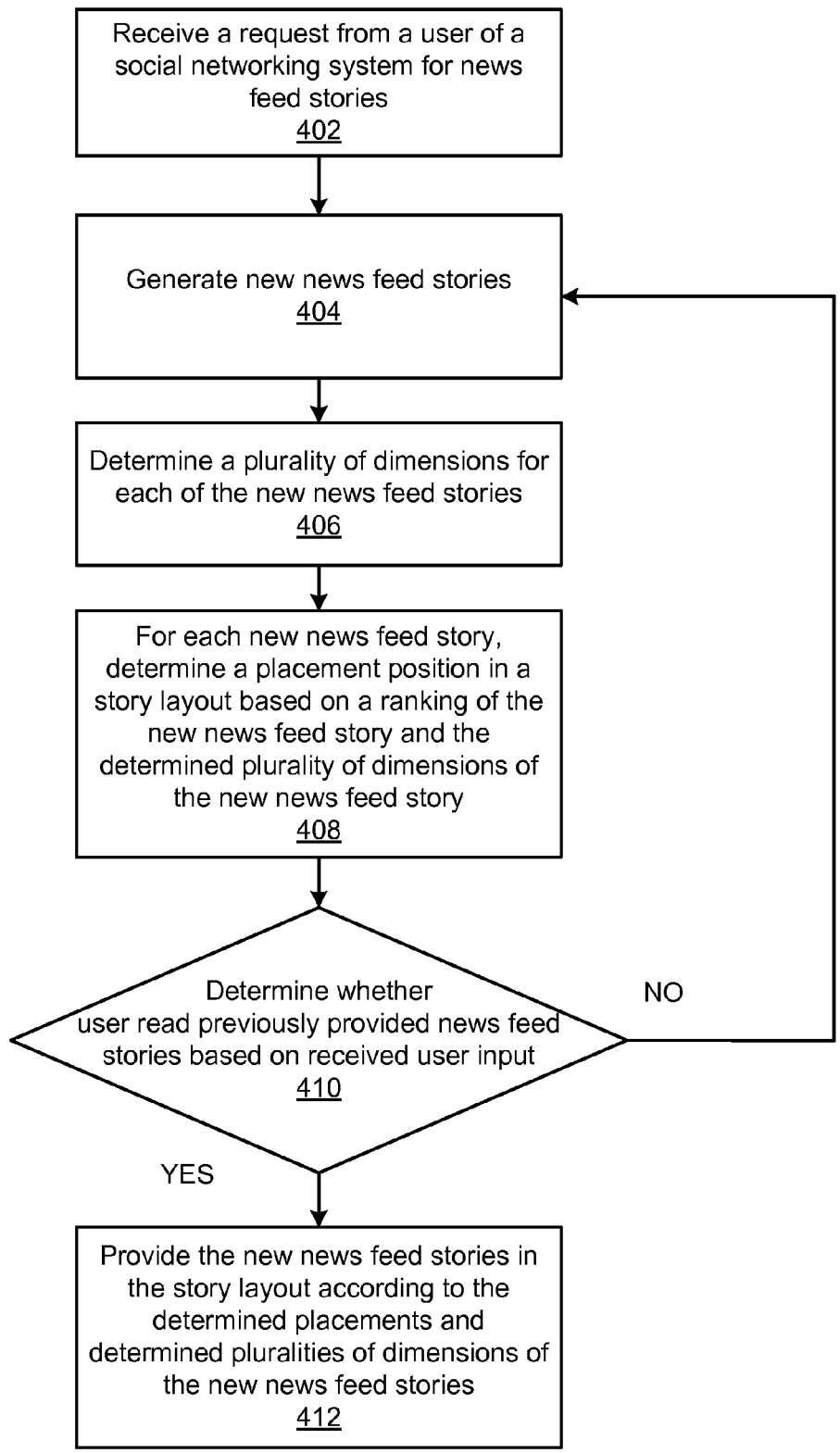
FIG. 4 is a flowchart of a process of selectively providing content in a multiple-column display to a viewing user of a social networking system, in accordance with an embodiment of the invention.

FIG. 4 illustrates a flow chart diagram depicting a process of selectively providing content in a multiple-column display to a viewing user of a social networking system, in accordance with an embodiment of the invention. A request for news feed stories is received 402 from a user of a social networking system. This request may be in the form of an application programming interface (API) call from a mobile device application that requests content for a news feed user interface on the user device, in one embodiment. In another embodiment, the request may be received 402 as a web page request for content in a news feed user interface displayed on a browser window operating on the user device.

Once a request for new news feed stories has been received 402, new news feed stories are generated 404. The story generator 300 in the story layout manager 122 may generate new news feed stories and hold them in a queue to be presented to the viewing user. The new news feed stories may be generated 404 from this queue, in one embodiment. In another embodiment, new news feed stories may be generated upon receiving 402 the request from the user. In a further embodiment, a news feed ranking module 114 may identify a top news feed story for the story layout manager 122 to determine a placement and dimensions in a determined story layout. As a result, the top news feed story is generated 404 as a new news feed story. This new news feed story may, in one embodiment, include a plurality of news feed stories that have been combined, clustered, or aggregated into a single news feed story. Remaining new news feed stories, other than the selected top news feed stories, are also generated 404.

After new news feed stories are generated 404, a plurality of dimensions are determined 406 for each of the new news feed stories. A plurality of dimensions may include determining audio and/or video content to be displayed in the new news feed story and the size of the audio and/or video content within the new news feed story, in one embodiment. In another embodiment, a plurality of dimensions may include the width and height of the new news feed story in context of the story layout. For example, a news feed story may include one or more photos uploaded by a user or entity to a photo album on the social networking system 100. The one or more photos may be cropped to preview the photos of users, concepts, and/or entities of the social networking system 100.

A story layout may have a default width and a default height for each news feed story based on a predetermined layout, such as a layout of three columns by three rows (3×3). In one embodiment, the default width and the default height may vary based on the resolution of the display screen of the user device on which the story layout is being displayed. In another embodiment, the default width and the default height may be based on the orientation of the display, such as a portrait orientation of three columns by five rows (3×5) or a landscape orientation of five columns by three rows (5×3). Other combinations of rows and columns may be used in other embodiments. In one embodiment, the predetermined layout may include a number of columns only. In another embodiment, the predetermined layout may include a number of rows only. A plurality of dimensions may also be determined 406 to overlap predetermined columns in a multiple-column display of the story layout. For example, if a high-quality, high resolution picture is used to display a top news feed story, the plurality of dimensions determined 406 for that news feed story may include dimensions that span multiple columns in the multiple-column display of the story layout. In another embodiment, multiple dimensions, or sizes, may be generated for a news feed story, such as small, medium, and large. A small dimension for a news feed story may be a predetermined width and height within the story layout, such as one row by one column. A medium dimension for a news feed story may be a predetermined width and height within the story layout, such as one row by two columns. A large dimension for a news feed story may be a predetermined width and height within the story layout, such as two rows by three columns. Determining a plurality of dimensions for news feed stories in a social networking system based on relevance to the viewing user is further described in a related application, "Aggregating Social Networking System User Information for Display Via Stories," U.S. patent application Ser. No. 13/239,354, filed on Sep. 21, 2011, hereby incorporated by reference. In one embodiment, the plurality of dimensions, or sizes, for news feed stories are determined based on a ranking by the news feed ranking module 114. In another embodiment, the plurality of dimensions for news feed stories are determined according to a prediction model for relevance to the viewing user based on previous user interactions on the social networking system 100. In a further embodiment, the news feed rankings may change dynamically, based on newly generated news feed stories.

After a plurality of dimensions are determined 406 for each of the new news feed stories, a placement of each new news feed story is determined 408 based on a ranking of the news feed story and the plurality of dimensions determined for the news feed story. The new news feed stories may be ranked by the news feed ranking module 114. Using that ranking, new news feed stories may be selected to be provided in the multiple-column display. Placement of each new news feed story may be determined 408 based on the ranking such that highly ranked news feed stories are placed higher in the multiple-column display than lower ranked news feed stories. The lowest ranked new news feed stories may not be displayed in the multiple-column display, in one embodiment. In another embodiment, the top new news feed stories that have a news feed ranking higher than a predetermined threshold are placed in ranked order, followed by the remaining new news feed stories in a chronological order, such as reverse chronological order, within the multiple-column display.

After the placement of the new news feed stories selected for display in the multiple-column display to the user has been determined 408, the social networking system 100 determines 410 whether the user read previously provided news feed stories based on received user input. If the social networking system 100 determines 410 that the user has not read the provided news feed stories based on received user input, then new news feed stories are continuously generated 404. In one embodiment, a link may be provided by the social networking system 100 to the user to indicate a number of new news feed stories that are available for viewing. User input that may indicate whether the user has read the provided news feed stories includes a scroll action on a web browser or mobile application, a click action on a link provided in a news feed story, and a refresh of the user interface on the web browser or mobile application. In one embodiment, no user input is needed, and if the web browser is active or the mobile application is open, the social networking system 100 may determine 410 that the user has read the provided news feed stories. In another embodiment, the social networking system 100 determines 410 that the user has read the provided news feed stories based on a predetermined time period elapsing.

After the social networking system 100 has determined 410 that the user has read the provided news feed stories, the new news feed stories are provided 412 in the story layout to the user according to the determined placements and determined pluralities of dimensions of the new news feed stories. The new news feed stories may be provided 412 on a user device connected to the social networking system 100 for display on a browser, in one embodiment. In another embodiment, the new news feed stories may be provided 412 on a user device connected to the social networking system 100 for display in a native application using an application programming interface (API). In a further embodiment, the new news feed stories may be provided 412 in an interface by the social networking system 100 to an external system, such as a third party website, through an embedded.

Figure 5C:
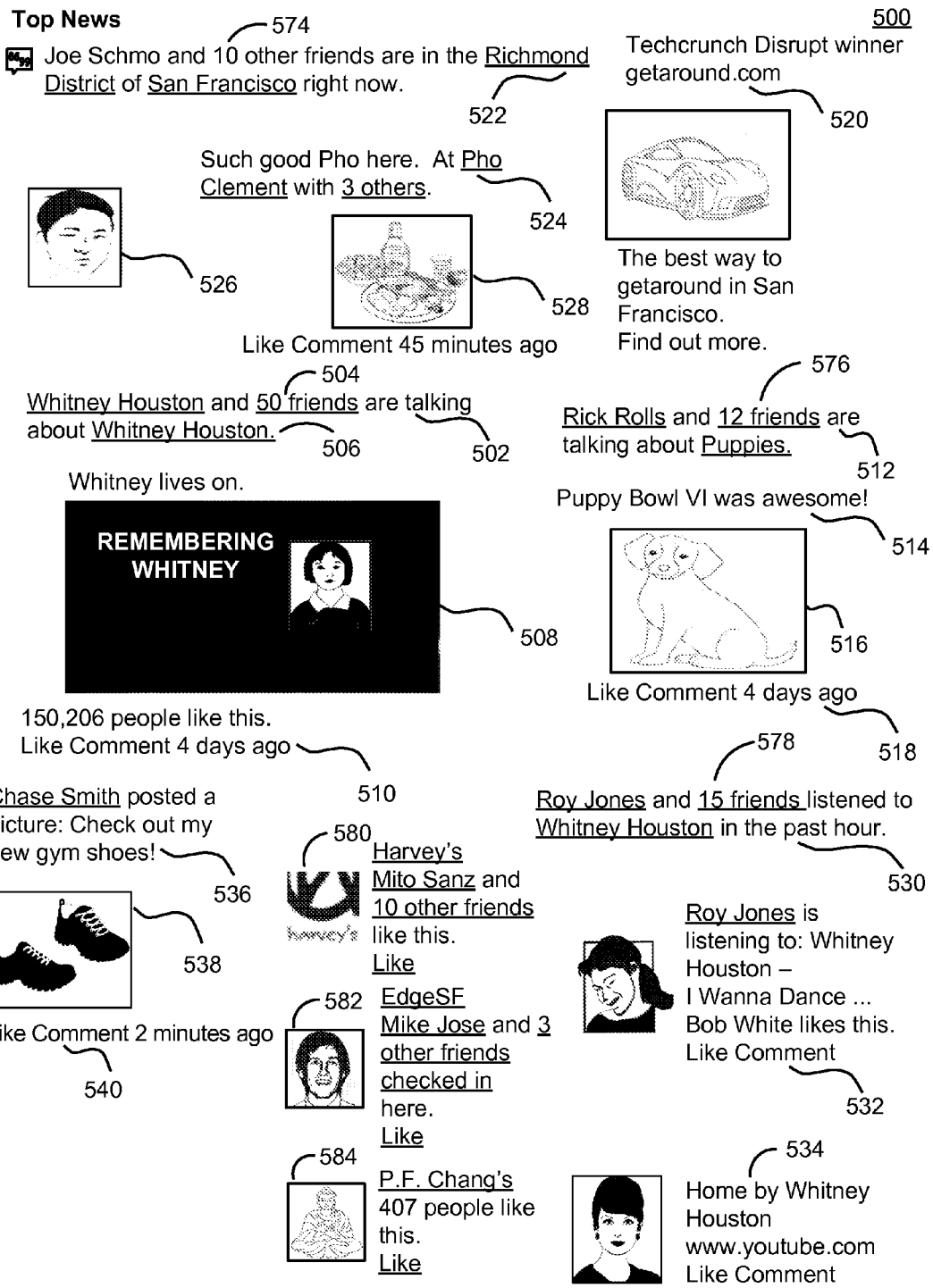

FIGS. 5A, 5B, 5C and 5D are examples of a user interface of a process of selectively providing content to a viewing user of a social networking system in a multiple-column display, in accordance with an embodiment of the invention. In FIG. 5A, the user interface provides a multiple-column news feed display 500 to a viewing user of the social networking system. The multiple-column news feed display 500 includes a plurality of news feed stories, including a news feed story 502 that is a cluster news feed story having a topic 506 about Whitney Houston which the page for Whitney Houston and fifty (50) friends of the viewing user are talking about. In one embodiment, a main story may be presented at the top of the multiple-column news feed display 500 based on popularity of a news feed story on the social networking system 100, meaning that the news feed story is being talked about by a minimum number of users. The news feed story 502 about Whitney Houston includes a statement 504 with a link to the page on the social networking system 100 about Whitney Houston, a link to view the 50 friends that are talking about Whitney Houston, and a link to the topic of Whitney Houston. Selection of the link to the topic of Whitney Houston included in the statement 504 may trigger a search query for posts made by users of the social networking system 100 about the topic of Whitney Houston. The news feed story 502 also includes an image 508 extracted from one of the stories clustered in the news feed story 502 about Whitney Houston and includes social context information 510 about the news feed story 502. As illustrated in FIG. 5A, the social context information 510 includes a statement that "150,206 people like this."

The multiple-column news feed display 500 also includes a news feed story 512 about Puppies, a news feed story 522 informing the viewing user that Joe Schmo and 8 other friends are in the Richmond District of San Francisco, an advertisement 520 for a car service, a news feed story 536 about new gym shoes, and a news feed story 530 about songs by Whitney Houston listened to by other users connected to the viewing user in the past hour. The news feed story 512 about Puppies may also be a cluster news feed story that may include a clustered news feed story 514 with an image 516 of a puppy and options 518 to interact with the clustered news feed story 514. A clustered news feed story 514 may be one of many clustered news feed stories that are included in a cluster news feed story, such as news feed story 512 about Puppies. The options 518 include expressing approval of the news feed story 514 ("liking" the story) and commenting on the news feed story 514.

The news feed story 522 informing the viewing user that Joe Schmo and 8 other friends are in the Richmond District of San Francisco may be a cluster news feed story that may also provide a clustered check-in event 524 by Joe Schmo, a profile picture 526 associated with Joe Schmo on the social networking system 100, and a photo 528 that was uploaded and associated with the check-in event 524 by Joe Schmo. The check-in event 524 may include a comment by Joe Schmo, the user of the social networking system 100 performing the check-in event 524. The check-in event 524 may also include a link to the location of the check-in event 524, Pho Clement, as well as a link to other users tagged at the check-in event 524, such as the "3 others" tagged in the check-in event 524.

The multiple-column news feed display 500 also includes a news feed story 536 about new gym shoes from "Chase Smith" that includes a photo 538 uploaded by that user and options 540 to interact with the news feed story 536. Because this news feed story 536 is ranked lower than the new news feed stories, the news feed story 536 is placed in the third row of the multiple-column news feed display 500 and occupies one tile in the second column. In contrast, the news feed story 502 about Whitney Houston is highly ranked by the social networking system 100 for the viewing user and is placed in the first row of the multiple-column news feed display 500, occupying three tiles in the first, second, and third columns. As another example, the news feed story 522 informing the viewing user that Joe Schmo and 8 other friends are in the Richmond District of San Francisco may be ranked higher than the news feed story 536 about new gym shoes. As a result, the news feed story 522 is placed in the second row of the multiple-column news feed display 500, occupying two tiles in the second and third columns. The news feed story 512 about puppies may have a slightly lower ranking than the news feed story 522 about Joe Schmo and other friends being in the Richmond District such that the news feed story 512 about puppies only occupies one tile on the second row at the first column.

The multiple-column news feed display 500 also includes a news feed story 530 that includes several custom graph action stories that may be automatically generated by the social networking system 100 upon receiving indications that users of the social networking system 100 performed the custom graph actions. For example, the news feed story 530 includes a statement that "Roy Jones and 10 friends listened to Whitney Houston in the past hour." The news feed story 530 further includes a graph action story 532 indicating the song was listened to by Roy Jones and that Bob White likes the graph action story 532. The news feed story 530 may also include a news feed story 534 that includes a link to a music video for "Home" by Whitney Houston that has been listened to by one of the users included in "Roy Jones and 10 friends." In other embodiments, automatically generated news feed stories may included aggregated counts of songs listened to by users of the social networking system 100, top songs listened to by artists that the viewing user may be interested in, news articles read by connected users of the social networking system 100, top games played by users on the social networking system 100, and so on.

Each news feed story included in the multiple-column news feed display 500 may include options for the viewing user to interact with the news feed stories, including expressing approval of the news feed story 510 by "liking" it and commenting on the news feed story 510. Other options may include sharing news feed stories with other users of the social networking system 100 connected to the viewing user. Additionally, some news feed stories may include an indication of other users that have also expressed interest in those news feed stories, including names of those users as well as a number of total users expressing interest. Although not illustrated, the multiple-column news feed display 500, in one embodiment, may also include an incoming news feed stories link that indicates to the viewing user that there are additional news feed stories that are ready to be presented. This link may appear as a pop-up window that may dynamically appear within the multiple-column news feed display 500. In another embodiment, the link may appear as a small button within the user interface for the social networking system 100.

In FIG. 5B, the multiple-column news feed display 500 expands to include an interaction detail display 550 that includes clustered news feed stories in the news feed story 502 about Whitney Houston. In one embodiment, the viewing user clicks on the news feed story 502 about Whitney Houston illustrated in FIG. 5A which results in the presentation of the interaction detail display 550 within the multiple-column news feed display 500. In another embodiment, the interaction detail display 550 may be provided as a pop-up window that overlaps the multiple-column news feed display 500. Illustrated within the interaction detail display 550, a viewing user may have access to clustered news feed stories that were grouped in the news feed story 502 about Whitney Houston, including a post 552 about comment 554 by Mike Wynn on a post by the page for Whitney Houston that includes social context information 556 about the comment, a post 558 by a page, 7 Live, that the viewing user is connected to on the social networking system 100 that includes a link 560 to an external website about Whitney Houston's funeral that also includes social context information 562, a post 564 by a user, Michael Tate, that includes text 566 and a link 568 to a music video by Whitney Houston as well as social context information 570, and a link 572 to additional posts that are included in the cluster news feed story 502. Clicking on the link 572 may deliver the additional posts within the interaction detail display 550.

As illustrated in FIG. 5C, the multiple-column news feed display 500 is shown after the interaction detail display 550 has been closed. Because the interaction detail display 550 was activated by the viewing user clicking on the news feed story 502 about Whitney Houston, that news feed story 502 appears in the second row of the multiple-column news feed display 500 and occupies only 2 tiles, overlapping the first and second columns. The social networking system 100 may use various algorithms and methods in selecting the size and placement of news feed stories in the multiple-column news feed display 500. One factor that may be used is whether the news feed story has been interacted with previously by the viewing user.

Also illustrated in FIG. 5C, the placement, or story layout, of the multiple-column news feed display 500 has changed. In the first row, occupying the first two columns, is the news feed story 522 about Joe Schmo. Included in the news feed story 522 is an update 574 on the number of friends that are in the Richmond District of San Francisco right now. The update 574 now indicates that 10 other friends are located in the Richmond District, compared to 8 other friends as originally posted and illustrated in FIG. 5A. This update 574 may include real-time check-in events that have occurred since the viewing user last interacted with the multiple-column news feed display 500.

The placement of advertisements, such as the advertisement 520 for car service, may also change dynamically as the viewing user interacts with the multiple-column news feed display 500. Now located in the first row, third column, the advertisement 520 for car service may grab the attention of the viewing user more than its previous location in the third row, first column, as illustrated in FIG. 5A. By dynamically changing the placement of advertisements and news feed stories in the multiple-column news feed display 500, the social networking system 100 may encourage more engagement with advertisements, leading to an enhanced user experience as well as additional revenue from advertisers.

In the second row, third column, the news feed story 512 about Puppies also includes an update 576 in the number of friends talking about Puppies. The update 576 informs the viewing user that 12 friends, as compared with 10 friends previously reported and illustrated in FIG. 5A, are now talking about Puppies. The "talking about" functionality of the social networking system may include any comments, posts, links, photo and/or video uploads, and messages on the social networking system 100 or systems connected to the social networking system 100 through custom graph actions and custom graph objects, in one embodiment. In another embodiment, the social networking system 100 may analyze content items on the social networking system 100 for keywords to enable the "talking about" functionality.

In the third row, first column, the news feed story 536 about new gym shoes is displayed, shifting one tile to the left as previously displayed and illustrated in FIG. 5A. In the third row, third column, the news feed story 530 that includes an update 578 that 15 friends listened to Whitney Houston. In the third row, second column, the social networking system 100 may display mini advertisements that occupy one tile, such as an advertisement 580 for a page that represents Harvey's, a restaurant which Mito Sanz and 10 other friends like, an advertisement 582 for a page that represents EdgeSF, a bar which Mike Jose and 3 other friends have checked in at, and an advertisement 584 for a page representing P. F. Chang's, a restaurant in which 407 people liked.

FIG. 5D illustrates the multiple-column news feed display 500 after the viewing user has scrolled down, in one embodiment. Other stories, aside from the top news, may be displayed in a stream format after the multiple-column news feed display 500. For example, a news feed story 586 about a link to a video on an external website shared by user Michael Roberts and 34 other users connected to the viewing user and a news feed story 588 indicating a new connection was formed between users Mary Joseph and Peter Carol may be displayed as "Other stories" after the multiple-column news feed display. The news feed story 586 includes a time indicator of when the link was first shared with the viewing user, 10 hours ago.

The news feed story 588 also includes social context information 590 of when the new connection was formed, 9 hours ago. In one embodiment, the story layout presentation module 304 may have placed the news feed story 586 about the shared link to an external video above the news feed story 588 about the formation of a new connection between other users of the social networking system because of the type of content included in the news feed story 586. The viewing user may be more interested in viewing shared links to external videos. In another embodiment, the story layout presentation module 304 may have placed the news feed story 586 about the shared link to an external video above the news feed story 588 because of the number of other connections that have shared the link. Other interactions, such as new comments by other users on the news feed story 586 may inform the social networking system 100 that the news feed story 586 may have evolved into a new incoming news feed story as determined by the story layout manager 122.

As further illustrated in FIG. 5D, previously presented news feed stories, such as the post 592 about a comment made by Mary Allen on Debbie Chang's photo, may also be presented below the multiple-column news feed display 500. A photo 596 included in the post 592, as well options and a time indicator 594 of when the comment was made, 5 hours ago, and social context information 598, Joe Jones and 4 others liking the post, may be included in the post 592. In one embodiment, the other stories that are displayed below the multiple-column news feed display 500 are ordered chronologically, such as reverse chronological order. In another embodiment, the other stories are displayed by relevance to the viewing user. In a further embodiment, the viewing user may be enabled to switch back and forth between the orderings.

In one embodiment, new incoming news feed stories and advertisements are dynamically rendered in the multiple-column news feed display 500 upon the viewing user interacting with news feed stories, as illustrated in FIGS. 5A-5C. In another embodiment, new incoming news feed stories and advertisements are automatically rendered in the multiple-column news feed display 500 upon generation by the social networking system 100. In yet another embodiment, new incoming news feed stories and advertisements may be presented to the viewing user in the multiple-column news feed display 500 even without interaction by the viewing user if the story layout manager 122 determines that the new incoming news feed stories are of such relevance and importance that the viewing user would want to view them immediately. In a further embodiment, new incoming news feed stories and advertisements are dynamically rendered in the multiple-column news feed display 500 because the social networking system 100 detects that the viewing user is actively engaged with the user interface that includes the multiple-column news feed display 500, such as detecting a scroll action, a click action on links within the multiple-column news feed display 500, or an active browser window or mobile application. In an alternative embodiment, new incoming news feed stories and advertisements are dynamically rendered in the multiple-column news feed display 500 upon the lapse of a predetermined time period.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   obtaining a plurality of news stories that describe a plurality of activities performed by a plurality of other entities with whom a viewing user has established a connection in a social networking system;
   ranking the plurality of news stories based on a determined affinity of the viewing user for an aspect of each of the news stories;
   selecting a set of top news stories from the plurality of news stories based on the ranking; and
   determining a story layout for the selected top news stories, the story layout comprising a placement of each of the selected top news stories in one or more of a plurality of columns, the placements based at least in part on the viewing user's affinity for the top stories;
   providing a news feed for display to the viewing user, where the news feed comprises the selected top news stories displayed according to the determined story layout, by
      generating an aggregated story based on a plurality of news stories having a common topic, where the aggregated story comprises a selectable link for expanding the aggregated story for displaying the plurality of news stories having the common topic, determining the story layout for the selected top news stories and the aggregated story, the story layout comprising a placement of each of the selected top news stories and the aggregated story in the one or more of the plurality of columns, where the placement is based at least in part on the viewing user's affinity for the top stories and the common topic, and providing the aggregated story in the news feed for display to the viewing user, where the news feed comprises the selected top news stories and the aggregated story displayed according to the determined story layout;

receiving a selection of the link for expanding the aggregated story for displaying the plurality of news stories having the common topic; and responsive to the received selection of the link, providing the plurality of news stories having the common topic for display in the news feed for display to the viewing user, where the news feed comprises the aggregated story displayed according to the determined story layout and the plurality of news stories having the common topic within the aggregated story.

2. The method of claim 1, wherein obtaining the plurality of news stories comprises:
retrieving a plurality of activities performed by a plurality of users connected to the viewing user on the social networking system after a last viewing session of the viewing user; and
generating news stories from the retrieved plurality of activities by the plurality of users connected to the viewing user.

3. The method of claim 1, wherein obtaining the plurality of news stories comprises:
retrieving a plurality of activities performed by a plurality of users connected to the viewing user on the social networking system after a decaying time period expires since a last viewing session of the viewing user; and
generating news stories from the retrieved plurality of activities by the plurality of users connected to the viewing user.

4. The method of claim 1, wherein obtaining the plurality of news stories comprises:
retrieving a plurality of activities performed by a plurality of users connected to the viewing user on the social networking system that have occurred during a current viewing session of the viewing user based on a time decay factor; and
generating news stories from the retrieved plurality of activities by the plurality of users connected to the viewing user.

5. The method of claim 1, wherein obtaining the plurality of news stories comprises:
retrieving a plurality of activities performed by a plurality of users connected to the viewing user on the social networking system after a last viewing session of the viewing user;
determining that a first activity of the plurality of activities was performed on a previously presented news feed story comprising a second activity performed by another user connected to the viewing user that was already provided for display to the viewing user; and
generating a news story comprising the first activity and the second activity.

6. The method of claim 1, wherein ranking the plurality of news stories comprises:

determining one or more sizes for each news story of the plurality of news stories based on one or more graphic images included in the news story; and
ranking the plurality of news stories based on the one or more sizes for each news story in addition to the determined affinity of the viewing user for an aspect of each of the news stories.

7. The method of claim 1, wherein determining the story layout comprises:
determining a plurality of columns for the story layout based on a set of dimensions of the ranked plurality of news stories.

8. The method of claim 1, wherein determining the story layout comprises:
determining one or more sizes for each news story of the plurality of news stories based on an affinity of the viewing user for one or more aspects of the news story; and
determining the story layout comprising the plurality of news stories based on the determined one or more sizes for each news story.

9. The method of claim 1, wherein determining the story layout comprises:
determining the placement of each news story of the plurality of news stories based on an affinity of the viewing user for one or more aspects of the news story; and
determining the story layout comprising the plurality of news stories based on the determined placement each news story.

10. The method of claim 1, wherein determining the story layout comprises:
determining the placement of each news story of the plurality of news stories based on a placement score determined based at least in part on an affinity of the viewing user for one or more aspects of the news story; and
determining the story layout comprising the plurality of news stories based on the determined placement each news story.

11. The method of claim 1, wherein determining the story layout comprises:
determining the placement of each news story of the plurality of news stories based on a placement score determined based at least in part on an affinity of one or more users connected to the viewing user for one or more aspects of the news story; and
determining the story layout comprising the plurality of news stories based on the determined placement each news story.

12. The method of claim 1, wherein determining the story layout comprises:
determining a plurality of columns for the story layout based on a set of dimensions of the ranked plurality of new news stories.

13. The method of claim 1, wherein determining the story layout comprises:
determining a placement of a news story that overlaps a plurality of columns in the story layout.

14. The method of claim 13, wherein determining the placement of the news story that overlaps a plurality of columns in the story layout is based on the determined affinity of the viewing user for an aspect of the news story.

15. The method of claim 1, wherein determining the story layout comprises:
determining a placement of a news story that overlap a plurality of columns in the story layout based on the plurality of dimensions of the ranked plurality of news stories.

16. The method of claim 1, wherein determining the story layout comprises:
   determining a placement of a news story that overlaps a plurality of rows in the story layout.

17. The method of claim 1, wherein ranking the news stories comprises:
   defining a prediction model comprising predictive factors based on received information about the viewing user and a plurality of dimensions of the news stories; and
   refining the prediction model based on user feedback regarding at least one top news feed story selected by the prediction model.

18. The method of claim 17, wherein the received information about the viewing user of the social networking system includes social graph information about other users connected to the viewing user in the social networking system.

19. The method of claim 1, wherein selecting the set of top news stories comprises:
   selecting a predetermined percentage of news stories based on the ranking as the set of top news stories.

20. The method of claim 1, wherein selecting the set of top news stories comprises:
   selecting at least one news story based on the news story having a high resolution graphic image for inclusion in the set of top news stories.

21. The method of claim 1, wherein the news feed further comprises a plurality of the news stories not selected as top news stories displayed in reverse chronological order in the news feed below the top news stories.

22. The method of claim 1, wherein the news feed further comprises a plurality of news stories presented to the viewing user in a previous viewing session displayed in the news feed below the top news stories.

23. The method of claim 1, further comprising:
   providing for display in the news feed a link indicating a count of new news stories available for display not previously viewed by the viewing user.

24. The method of claim 1, wherein providing a news feed further comprises:
   providing the news feed for display to the viewing user, where the news feed comprises the selected top news stories displayed according to the determined story layout displayed above a remainder of the news stories, wherein the remainder of the new news stories comprises at least one new news story that was not selected in the set of top news stories.

25. The method of claim 1, wherein providing a news feed further comprises:
   generating a plurality of advertisements based on at least one determined affinity of the viewing user based on an aspect of the news stories;
   determining the story layout for the selected top news stories and at least one of the plurality of advertisements, the story layout comprising a placement of each of the selected top news stories and the at least one of the plurality of advertisements in the one or more of the plurality of columns, where the placement is based at least in part on the viewing user's affinity for the top stories and the at least one of the plurality of advertisements; and
   providing the at least one of the plurality of advertisements in the news feed for display to the viewing user, where the news feed comprises the selected top news stories and the at least one of the plurality of advertisements displayed according to the determined story layout.

26. A method comprising:
   receiving a request from a user device associated with a viewing user of a social networking system for content from the social networking system;
   obtaining a plurality of news stories based on a plurality of activities performed by a plurality of other entities with whom the viewing user has established a connection in the social networking system;
   determining a plurality of sizes for each news story of the plurality of news stories based on a plurality of dimensions of each news story;
   determining at least one ranking for the plurality of news stories based at least in part on an affinity of the viewing user for an aspect of each news story; and
   for each news story of the plurality of news stories, selecting a size based on the at least one ranking for the news story; and
   providing the plurality of news stories, the selected plurality of sizes of the plurality of news stories, and the ranking of the plurality of news stories to the user device associated with the viewing user, where the user device is configured to determine a layout for the news stories based on the received ranking and display the news stories according to the layout, the plurality of news stories provided by
      generating an aggregated story based on a plurality of news stories having a common topic, where the aggregated story comprises a selectable link for expanding the aggregated story for displaying the plurality of news stories having the common topic,
      determining the story layout for the selected top news stories and the aggregated story, the story layout comprising a placement of each of the selected top news stories and the aggregated story in the one or more of the plurality of columns, where the placement is based at least in part on the viewing user's affinity for the top stories and the common topic, and
      providing the aggregated story in the news feed for display to the viewing user, where the news feed comprises the selected top news stories and the aggregated story displayed according to the determined story layout;
   receiving a selection of the link for expanding the aggregated story for displaying the plurality of news stories having the common topic; and
   responsive to the received selection of the link, providing the plurality of news stories having the common topic for display in the news feed for display to the viewing user, where the news feed comprises the aggregated story displayed according to the determined story layout and the plurality of news stories having the common topic within the aggregated story.

27. The method of claim 26, wherein determining the at least one ranking for each news story comprises:
   for each news story of the plurality of news stories,
      determining a relevance of the news story to the viewing user; and
      determining the ranking of news story based on the determined relevance.

28. The method of claim 26, wherein determining the plurality of rankings for each of the plurality of news stories comprises:
   for each news story of the plurality of news stories,
      determining a relevance of the news story to at least one other user connected the viewing user, where the viewing user's affinity score for the at least one other user exceeds a predetermined threshold; and determining the ranking of news story based on the determined relevance.

29. The method of claim 26, wherein determining the plurality of sizes for each news story comprises determining a small size, a medium size, and a large size for each news story, and wherein selecting a size for each news story further comprises:
for each new news story,
selecting the large size for the news story responsive to the determined ranking of the news story exceeding a first predetermined threshold;
selecting the medium size for the news story responsive to the determined ranking of the news story exceeding a second predetermined threshold; and
selecting the small size for the news story responsive to the determined ranking of the news story exceeding a third predetermined threshold,
wherein the first predetermined threshold is greater than the second predetermined threshold and the second predetermined threshold is greater than the third predetermined threshold.

30. The method of claim 26, further comprising:
determining a plurality of layouts for the plurality of news stories based on the determined plurality of sizes for each news story and based on the ranking of the plurality of new news stories; and
providing the determined layouts to the user device, where the user device is further configured to select a layout of the determined layouts based on display format information of the user device.

31. The method of claim 26, further comprising:
receiving display resolution information from the user device associated with the viewing user,
wherein selecting the size for each news story is based on the received display resolution information.

32. The method of claim 26, further comprising:
receiving browser window size information from the user device associated with the viewing user,
wherein selecting a size for each news story is based on the received browser window size information.

33. A method comprising:
receiving a request from a user device associated with a viewing user of a social networking system for content from the social networking system;
obtaining a plurality of new news stories based on a plurality of activities performed by a plurality of other entities with whom the viewing user has established a connection in the social networking system;
determining a ranking of the plurality of new news stories based at least in part on an affinity of the viewing user for each of the plurality of new news stories;
determining a plurality of sizes for each of the plurality of new news stories based on a plurality of dimensions of each new news story and the ranking of the plurality of new news stories; and
providing a plurality of news stories previously provided to the viewing user, the plurality of new news stories, the plurality of sizes of the plurality of new news stories, and the ranking of the plurality of new news stories to the user device associated with the viewing user, where the user device is configured to determine a layout for the new news stories and the plurality of news stories previously provided to the viewing user based on the receiving ranking and display the new news stories and the plurality of news stories previously provided to the viewing user according to the layout, the plurality of news stories provided by generating an aggregated story based on a plurality of news stories having a common topic, where the aggregated story comprises a selectable link for expanding the aggregated story for displaying the plurality of news stories having the common topic,
determining the story layout for the selected top news stories and the aggregated story, the story layout comprising a placement of each of the selected top news stories and the aggregated story in the one or more of the plurality of columns, where the placement is based at least in part on the viewing user's affinity for the top stories and the common topic, and
providing the aggregated story in the news feed for display to the viewing user, where the news feed comprises the selected top news stories and the aggregated story displayed according to the determined story layout;
receiving a selection of the link for expanding the aggregated story for displaying the plurality of news stories having the common topic; and
responsive to the received selection of the link, providing the plurality of news stories having the common topic for display in the news feed for display to the viewing user, where the news feed comprises the aggregated story displayed according to the determined aggregated story layout and the plurality of news stories having the common topic within the aggregated story.

34. The method of claim 33, wherein determining the ranking of the plurality of new news stories comprises:
determining a relevance of each of the plurality of new news stories;
selecting a size for each of the plurality of new news stories based on the determined relevance; and
determining the ranking of the plurality of new news stories based upon the relevance of each of the plurality of new news stories and the selected size for each new news story.

35. The method of claim 33, wherein determining the ranking of the plurality of new news stories comprises determining a relevance of each of the plurality of new news stories, and wherein the method further comprises:
selecting a size for each of the plurality of new news stories based on the determined ranking of the plurality of new news stories;
determining a layout of the plurality of new news stories based the ranking of the plurality of new news stories and the selected size for each new news story; and
providing the plurality of new news stories for display on the user device according to the determined layout.

36. The method of claim 35, wherein determining the plurality of sizes for each of the plurality of new news stories comprises determining a small size, a medium size, and a large size for each of the plurality of new news stories, and wherein selecting a size for each of the plurality of new news stories further comprises:
for each new news story,
selecting the large size for the new news story responsive to the determined ranking of the new news story exceeding a first predetermined threshold;
selecting the medium size for the new news story responsive to the determined ranking of the new news story exceeding a second predetermined threshold; and
selecting the small size for the new news story responsive to the determined ranking of the new news story exceeding a third predetermined threshold, wherein the first predetermined threshold is greater than the second predetermined threshold and the second predetermined threshold is greater than the third predetermined threshold.

37. The method of claim 33, further comprising:
determining a layout of the plurality of new news stories based on the determined plurality of sizes for each of the plurality of new news stories and based on the ranking of the plurality of new news stories; and
providing the plurality of new news stories for display on the user device according to the determined layout.

38. The method of claim 33, further comprising:
receiving display resolution information from the user device associated with the viewing user;
selecting a size for each of the plurality of new news stories based on the received display resolution information;
determining a layout of the plurality of new news stories based on the selected size for each of the plurality of new news stories and based on the ranking of the plurality of new news stories; and
providing the plurality of new news stories for display on the user device according to the determined layout.

39. The method of claim 33, further comprising:
receiving browser window size information from the user device associated with the viewing user;
selecting a size for each of the plurality of new news stories based on the received browser window size information;
determining a layout of the plurality of new news stories based on the selected size for each of the plurality of new news stories and based on the ranking of the plurality of new news stories; and
providing the plurality of new news stories for display on the user device according to the determined layout.

40. The method of claim 33, wherein obtaining the plurality of new news stories comprises:
retrieving a plurality of activities performed by a plurality of users connected to the viewing user on the social networking system after a last viewing session of the viewing user; and
generating the plurality of new news stories from the retrieved plurality of activities by the plurality of users connected to the viewing user.

41. The method of claim 33, wherein obtaining the plurality of new news stories comprises:
retrieving a plurality of activities performed by a plurality of users connected to the viewing user on the social networking system after a decaying time period expires since a last viewing session of the viewing user; and
generating the plurality of new news stories from the retrieved plurality of activities by the plurality of users connected to the viewing user.

42. The method of claim 33, wherein obtaining the plurality of new news stories comprises:
retrieving a plurality of activities performed by a plurality of users connected to the viewing user on the social networking system that have occurred during a current viewing session of the viewing user based on a time decay factor; and
generating the plurality of new news stories from the retrieved plurality of activities by the plurality of users connected to the viewing user.

43. The method of claim 33, wherein obtaining the plurality of new news stories comprises:
retrieving a plurality of activities performed by a plurality of users connected to the viewing user on the social networking system after a last viewing session of the viewing user;
determining that a first activity of the plurality of activities was performed on a previously presented news feed story comprising a second activity performed by another user connected to the viewing user that was already provided for display to the viewing user; and
generating a new news story comprising the first activity and the second activity.

* * * * *